United States Patent [19]

Connolly

[11] Patent Number: 4,664,972
[45] Date of Patent: May 12, 1987

[54] OPTICALLY ANISOTROPIC MELT FORMING AROMATIC COPOLYESTERS BASED ON T-BUTYLHYDROQUINONE

[75] Inventor: Mark S. Connolly, Wilmington, Del.

[73] Assignee: E. I. Du Pont de Nemours and Company, Wilmington, Del.

[21] Appl. No.: 855,036

[22] Filed: Apr. 23, 1986

[51] Int. Cl.$^4$ .............................................. B32B 27/00
[52] U.S. Cl. ................................. 428/290; 264/331.21; 528/171; 528/173; 528/176; 528/190; 528/193; 528/194; 528/206
[58] Field of Search .................. 428/290; 264/331.21; 528/176, 193, 194, 190, 171, 173, 206

[56] References Cited

U.S. PATENT DOCUMENTS

| | | | |
|---|---|---|---|
| 4,169,933 | 10/1979 | Jackson, Jr. et al. | 528/190 |
| 4,188,372 | 10/1978 | Schaefgen | 528/190 |
| 4,219,461 | 8/1980 | Calundann | 260/40 P |
| 4,238,600 | 12/1980 | Jackson, Jr. | 528/193 |
| 4,242,496 | 12/1980 | Jackson, Jr. et al. | 528/190 |
| 4,377,681 | 3/1983 | Deex | 528/193 |
| 4,412,058 | 10/1983 | Siemionko | 528/191 |
| 4,447,593 | 5/1984 | Funakoshi et al. | 528/176 |
| 4,529,565 | 7/1985 | Kasatani et al. | 528/176 X |
| 4,536,562 | 8/1985 | Deex | 528/193 |
| 4,564,669 | 1/1986 | Dicke et al. | 528/173 |

FOREIGN PATENT DOCUMENTS 3419749A 11/1985 Fed. Rep. of Germany.
2161171A 1/1986 United Kingdom.

OTHER PUBLICATIONS

W. J. Jackson, Jr., "Liquid Crystal Polymers: VI Liquid Crystalline Polyesters of Substituted Hydroquinones," Contemporary-Topics in Polymer Science, 1984, vol. 5, pp. 177-208.

*Primary Examiner*—Lucille M. Phynes

[57] ABSTRACT

Novel copolyesters derived from (a) aromatic diols, (b) dicarboxylic acids and (c) aromatic hydroxy carboxylic acids, in which t-butylhydroquinone constitutes 55 to 95 mole % of the diol component (a) are disclosed. These copolyesters are anisotropic and fabricable in the melt. They generally can be processed using conventional thermoplastic shaping techniques at temperatures below 350° C. into moldings, fibers and films which have outstanding mechanical properties.

21 Claims, No Drawings

OPTICALLY ANISOTROPIC MELT FORMING AROMATIC COPOLYESTERS BASED ON T-BUTYLHYDROQUINONE

BACKGROUND OF THE INVENTION

This invention relates to novel aromatic copolyesters that are optically anisotropic in the melt and that are derived from (a) t-butylhyroquinone, (b) other aromatic diols, (c) aromatic dicarboxylic acids and (d) aromatic hydroxycarboxylic acids. The key to this invention is the fact that the t-butylhydroquinone constitutes the major portion of the diol in the claimed copolyesters. These polymers range from glassy to semi-crystalline and are unexpectedly melt processable at temperatures generally at or below 350° C.

Optically anisotropic melt forming aromatic copolyesters based on various combinations or aromatic diols, aromatic dicarboxylic acids and aromatic hydroxy carboxylic acids are well known in the art. Due to the melt anisotropy of such aromatic copolyesters, shaped articles such as films and fibers made from them tend to have excellent mechanical properties. Unfortunately, the copolyesters also tend to have very high crystalline melting temperatures, a factor which makes it difficult to process them in conventional melt-processing equipment.

The art is replete with attempts to improve the melt processability of anisotropic aromatic copolyesters (generally, by lowering crystalline melting temperatures) by altering one or more of the components in the polymer. For example, some have tried to achieve lower melting points by incorporating different substituents on the aromatic rings or by using some aromatic rings having chain extending linkages which are neither parallel nor coaxial. Numerous attempts have centered upon altering the diol component of the copolyester, as is the case in the present invention.

U.S. Pat. No. 4,447,593 to Funakoshi et al. discloses an aromatic polyester having melt anisotropy and a diol component comprising units derived from a mono-substituted hydroquinone ring substituted by a specified substituent. More specifically, the diol component of the disclosed copolyester consists of at least about 90 mole % of (a) a mono-substituted hydroquinone ring-substituted by an alkyl group having at least 5 carbon atoms or an aralkyl group having at least 7 carbon atoms or (b) a mixture of said mono-substituted hydroquinone and unsubstituted hydroquinone or a substituted hydroquinone other than said mono-substituted hydroquinone, the proportion of said mono-substituted hydroquinone being at least 80 mole %. The remaining up to 10 mole % of the diol unit may be unsubstituted hydroquinone or a substituted hydroquinone such as t-butylhydroquinone. No specific examples of copolyesters containing more than one diol, and thus no examples of copolyesters incorporating t-butylhydroquinone, are presented in the patent.

U.S. Pat. No. 4,536,562 to Deex discloses liquid crystalline copolyesters prepared from 4-hydroxybenzoic acid, isophthalic and/or terephthalic acid and a diol component consisting of 1 to 50 mole % of a substituted hydroquinone and 99 to 50 mole % of unsubstituted hydroquinone. The substituent on the substituted hydroquinone is selected from $C_1$-$C_6$ alkyl, phenyl and phenyl substituted with $C_1$-$C_6$ alkyl, chloro, bromo, cyano, formyl, acetyl and trifluoromethyl. No examples of copolyesthers incorporating t-butylhydroquinone are provided. Deex observes that his copolyesters are lower melting and also more crystalline than corresponding prior art polymers.

German Patent Application No. 3419749A, published Nov. 28, 1985, discloses thermotropic aromatic polyesters based on (a) optionally substituted 4-hydroxybenzoic acid, (b) isophthalic acid or mixtures of isophthalic acid with up to 50 mole % terephthalic acid, (c) hydroquinone and (d) 3,4'- and/or 4,4'-dihydroxydiphenyl, 3,4'- and/or 4,4'-dihydroxydiphenylether, and/or 3,4'- and/or 4,4'-dihydroxydiphenyl sulfide. The hydroquinone component (c) can comprise from 50 to 96 mole % of the total diol component (c+d).

Great Britain Patent Application No. 2161171A, published Jan. 8, 1986, discloses aromatic polyesters based on terephthalic acid, isophthalic acid, substituted hydroquinone (where the substituent may be halogen, hydrocarbon, alkoxy or phenoxy) and, optionally, a diol of the formula

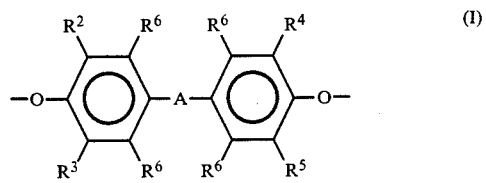

where A is O, S, sulfonyl, carbonyl, alkyl(id)ene or a single bond.

U.S. Pat. No. 4,564,669 to Dicke et al. discloses thermotropic aromatic polyesters derived from (a) a diol component consisting of 100 to 10 mole % 2,7-dihydroxynaphthalene and 0 to 90 mole % of certain aromatic diols, (b) terephthalic and/or isophthalic acid, and (c) 4-hydroxybenzoic acid. These polyesters are alleged to have outstanding mechanical properties and to be very easy to process.

Only two references are known which disclose copolyesters in which the major portion of the diol component is t-butylhydroquinone. U.S. Pat. No. 4,238,600 to Jackson, Jr. et al. discloses copolyesters derived from terephthalic acid and a diol comprised of 35 to 75 mole % phenylhydroquinone and 25 to 65 mole % t-butylhydroquinone. The copolyesters of the Jackson patent do not contain a hydrocarboxylic acid component as do those claimed herein. Importantly, the patient discloses that the melting points of the polymers increase with the proportion of t-butylhydroquinone.

W. J. Jackson, Jr., "Liquid Crystal Polymers: VI. Liquid Crystalline Polyesters of Substituted Hydroquinones", Contemporary Topics in Polymer Science, 1984, Vol. 5, pp. 177-208 (hereinafter, "the Jackson article") makes several references to copolyesters containing t-butylhydroquinone. At page 181, it is noted that copolyesters prepared from tetrephthalic acid and t-butylhydroquinone solidifed during preparation and melt at too high a temperature to be melt spun or injection molded without thermally degrading. At page 184, it is noted that copolyesters prepared from terephathalic acid, phenylhydroquinone and t-butylhydroquinone have higher melting points than those prepared from the same components but using chloro- or methylhydroquinone in place of t-butylhydroquinone. At page 192, copolyesters prepared from terephtalic acid, t-butylhydroquinone and p-hydroxybenzoic acid are disclosed. The lowest melting point for any of the polymers so disclosed is about 360° C. for the polymer containing about 25 mole % 4-hydroxybenzoic acid, based on total moles copolyester. (Note that Jackson uses a different method for calculating mole % of 4-hydroxybenzoic acid than is used in this application. See page 191 of the Jackson article.) Thus, much of the Jackson article indicates that the copolyesters disclosed therein would be difficult to process. However, the Jackson article also indicates (page 191) that copolyesters with high melting temperatures can be fabricated at temperatures appreciably below the crystalline melting temperature, without the loss of high strength or stiffness, if they possess low softening temperatures. It has now been found that the Jackson copolyesters, despite the fact that they may have softening temperatures appreciably below their crystalline melting temperatures, still do not possess as high a degree of processability as would be desired. In this regard, attention is invited to the Comparative Example preceding the claims in this application.

An object of this invention is to provide optically anisotropic melt forming copolyesters which possess a high degrees of processability and outstanding mechanical properties. Another object of the invention is to produce optically anisotropic melt forming aromatic copolyesters which may by processed by thermoplastic shaping to produce mouldings, fibers, and films which have a high strength and stiffness.

Surprisingly, it has been found that the copolyesters described below have this desired combination of advantageous properties.

SUMMARY OF THE INVENTION

The novel copolyesters of this invention are derived from components consisting essentially of:

I. An aromatic diol component consisting of 95 to 55 mole % t-butylhydroquinone and 5 to 45 mole % of one or more polyaromatic diols;

II. A dicarboxylic acid component selected from a "para"- or "meta"-oriented aromatic dicarboxylic acid and 1,4-cyclohexane dicarboxylic acid, and mixtures thereof, provided that any naphthalene dicarboxylic acid comprises not greater than about 80 mole % of the dicarboxylic acid component; and III. An aromatic hydroxycarboxylic acid component selected from 4-hydroxybenzoic acid, 6-hydroxy-2-naphthoic acid and 4(4'-hydroxyphenyl)benzoic acid and mixtures thereof;

where said copolyester contains equal chemical equivalents of components I and II and contains about 20 to 60 mole %, based on total moles of I plus II plus III, of component III.

These novel copolyesters are advantageous because they are fabricable in the melt and are anisotropic in the melt using conventional molding equipment and techniques, generally at temperatures below 350° C. They are anisotropic in the melt which leads to their utility as engineering plastics where high mechanical properties (e.g., stiffness and strength) and moderate temperature resistance are needed.

DETAILED DESCRIPTION OF THE INVENTION

All of the components used to prepare the copolyesters of this invention are either available commercially or may be prepared by methods well known in the art.

The minor diol component in the copolyester of this invention is a polyaromatic diol or mixture of said diols.

The term "polyaromatic" as used in this application means that the diol has two or more aromatic ring structures at least two of which form part of the backbone of the copolyester of the invention. The aromatic rings may be fused (e.g., as in naphthalene), may be directly linked (e.g., as in diphenyl), or may be connected by other moieties (e.g., as in bisphenol-A, bisphenol-AF or diphenylsulfone). The preferred diols are compounds in which, in a realistic planar representation, the bonds joining the diolic oxygens to the rest of the molecule are either colinear or parallel to each other and are not in an ortho or a peri relationship (as would be the case, e.g., with 1,8-dihydroxynaphthalene). Examples of such diol moieties are as follows:

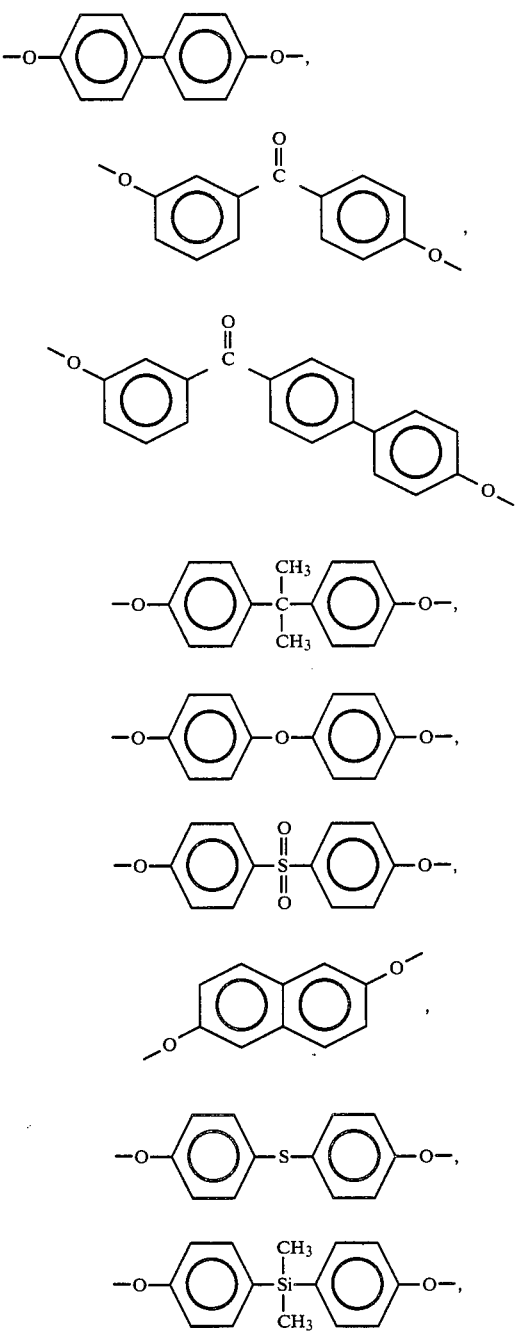

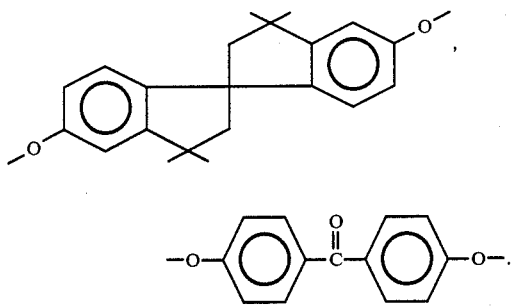

The 3,4'-derivatives of these diols may also be used. The aromatic rings in the diol may optionally be substituted with one or more substituents, e.g., alkyl, halogen or alkyloxy and others. The preferred minor diols are 4,4'-dihydroxydiphenyl (4,4'-biphenol, 2,2'-bis(4-hydroxyphenyl)propane (bisphenol-A), 3-hydroxy-4'-(4-hydroxyphenyl)benzophenone, 3,4' or 4,4'-dihydroxybenzophenone, 2,6- or 2,7-dihydroxy-naphthalene, 4,4'-dihydroxydiphenylsulfone, 4,4'-dihydroxydiphenylether, and 4,4'-dihydroxydiphenylsulfide. The most preferred minor diols are bisphenol-A and 4,4'-biphenol. The preferred amount of the minor diol is 5 to 25 mole %, more preferably 10 to 20 mole %, based on total moles of diol.

The dicarboxylic acid component of the copolyester of this invention may be a "para"- or "meta"-oriented aromatic dicarboxylic acid or 1,4-cyclohexane dicarboxylic acid or mixtures thereof, provided that no more than 80 mole % of the dicarboxylic acid component comprises a napthalene dicarboxylic acid. Examples of "para"-oriented aromatic dicarboxylic acids are terephthalic acid, 1,4-naphthalene dicarboxylic acid, 1,5-naphthalene dicarboxylic acid, 2,6-naphthalene dicarboxylic acid, 4,4'-diphenyl dicarboxylic acid and 3,3'-diphenyl dicarboxylic acid. (The "para"-oriented dicarboxylic acids are those in which the two carboxyl groups bonded to the aromatic rings are not adjacent to each other or in a peri relationship but are arranged coaxially or parallelly in a realistic planar representation of the molecule.) Examples of "meta"-oriented dicarboxylic acids are isophthalic acid, 1,3-naphthalene dicarboxylic acid, 1,6-naphthalene dicarboxylic acid, 1,7-naphthalene dicarboxylic acid, 2,7-naphthalene dicarboxylic acid, and 3,4'-diphenyl dicarboxylic acid. (The "meta"-oriented dicarboxylic acid are those in which the two carboxyl groups bonded to the aromatic ring(s) are not adjacent to each other or in a peri relationship and are not arranged coaxially or parallelly in a realistic planar representation of the molecule). Any of these aromatic dicarboxylic acids may optionally be substituted with one or more substituents such as alkyl, alkyloxy or halogen, to name a few. When the dicarboxylic acid is 1,4-cyclohexane dicarboxylic acid, it is preferably the trans-isomer (meaning at least about 80% the trans-isomer). The preferred dicarboxylic acids are terephthalic acid, isophthalic acid, trans-1,4-cyclohexane dicarboxylic acid, and 2,6-naphthalene dicarboxylic acid and mixtures thereof, provided that isophthalic acid comprises no more than about 50 mole % of the dicarboxylic acid component and 2,6-naphthalene dicarboxylic acid comprises no more than about 60 mole % of the dicarboxylic acid component. The most preferred dicarboxylic acid is terephthalic acid.

The copolyesters of this invention contain about 20 to 60 mole %, based on the total moles copolyester, of an aromatic hydroxycarboxylic acid selected from 4-hydroxybenzoic acid, 6-hydroxy-2-naphthoic acid, 4-(4'-hydroxyphenyl)-benzoic acid and mixtures thereof. These hydroxy carboxylic acids may optionally be substituted with a substituent such as alkyl, halogen or alkyloxy substituent. Preferably, the hydroxycarboxylic acid is 4-hydroxybenzoic acid or 6-hydroxy-2-naphthoic acid or mixtures thereof and comprises about 25 to 50 mole % of the copolyester. In another preferred embodiment, the possible mixtures of 4-hydroxybenzoic acid and 6-hydroxy-2-naphthoic acid contain at least about 75 mole % 4-hydroxybenzoic acid. More preferably, the hydroxyacid is 4-hydroxybenzoic acid and comprises about 25 to 35 mole % of the copolyester.

The preferred copolyesters of this invention consist essentially of:
I. Diol:95–75 mole % t-butylhydroquinone; 5–25 mole % of a diol selected from 4,4'-biphenol; bisphenol-A; 3-hydroxy-4'-(4-hydroxyphenyl)benzophenone; 3,4'- or 4,4'-dihydroxybenzophenone; 2,6- or 2,7-dihydroxynaphthalene; 4,4'-dihydroxydiphenylsulfone; 4,4'-dihydroxydiphenylether; 4,4'-dihydroxydiphenylsulfide; or mixtures thereof.
II. Dicarboxylic acid: terephthalic acid; isophthalic acid; trans-1,4-cyclohexane dicarboxylic acid; 2,6-naphthalene dicarboxylic acid and mixtures thereof; provided that no more than about 50 mole % of the dicarboxylic acid is isophthalic acid and no more than about 60 mole % of the dicarboxylic acid is 2,6-naphthalene dicarboxylic acid.
III. Hydroxycarboxylic acid: 25–50 mole %, based on moles I+II+III, 4-hydroxybenzoic acid or 6-hydroxy-2-naphthoic acid or mixtures thereof.

The most preferred copolyesters of this invention, by virtue of the ease with which they can be made and processed and the outstanding mechanical properties which they possess, consist essentially of:
I. Diol: 90–80 mole % t-butylhydroquinone; 10–20 mole %, 4,4'-biphenol or biphenol-A
II. Diacid: terephthalic acid
III. Hydroxyacid: 25 to 35 mole %, based on moles I+II+III, 4-hydroxybenzoic acid.

The copolyesters of this invention may be prepared by conventional polymerization techniques such as described in U.S. Pat. No. 4,118,372 and in the examples below, preferably under anhydrous conditions in an inert atmosphere. The copolyesters may be formed by a variety of ester-forming techniques from organic monomers possessing functional groups which upon condensation form the requisite recurring moieties. For example, the functional groups of the organic aromatic monomer compounds may be carboxylic acid groups, acyloxy groups, acid halide groups, etc. The organic monomer compounds may be allowed to react in the absence of a heat exchange fluid via a melt acidolysis procedure, in a suitable solvent via a solution procedure, or in a heat exchange medium via a slurry polymerization as described in U.S. Pat. No. 4,067,852.

The copolyesters of this invention are anisotropic in the molten state at temperatures below approximately 400° C., a factor which leads to high orientation, high strength, and high initial modulus of shaped articles (e.g., fibers or films) prepared from the copolyesters. Optical anisotropy of the copolyester melts can be determined by examination of the materials with the use of an optical microscope. It is known that optically anisotropic materials cause plane polarized light to be rotated, whereas rotation of polarized light is zero for transmission through isotropic materials. Thus, optical anisotropy can be determined by placing a sample of the polymer on a heating stage of a microscope set with crossed polarizers and increasing the temperature beyond the polymer flow temperature. If the polymer is optically anisotropic in the melt, a bright static field will be observed at temperatures above the polymer flow temperature. These observations may be confirmed by the use of the Thermooptical Test (TOT) described in U.S. Pat. No. 4,066,620 and 4,118,372. Polymers which pass this test are considered to be optically anisotropic.

The glass transition temperatures (Tg) of the copolyesters of this invention generally range from about 130° C. to 260° C., preferably about 170° C. to 190° C. The inherent viscosity of the copolymers (measured as described below) is generally at least about 0.5 dL/g, preferably about 2 dL/g or greater.

The copolyesters of this invention can be used in the form of shaped articles which can be prepared from the melt phase by extrusion, injection molding, compression molding or other convenient means. Such shaped articles include films, fibers, mechanical parts and the like. The copolyesters of this invention may also be used in the form of coatings. Using common coating techniques, coatings can be applied to wire, films, fabrics, etc.

Tests at room temperature (23° C.) indicate that injection molded samples of many of the copolyesters of this invention have high strength (e.g., strength of about 10 Kpsi, and usually 15 Kpsi, or greater) and high moduli (e.g., moduli of about 1000 Kpsi, and usually 2000 Kpsi, or greater) in at least one direction. Tests also indicate that heat-treated fibers of some of the copolyesters of this invention have high tenacities (e.g., about 20 g/d or greater) and high initial moduli (e.g., moduli of about 500 g/d or greater); and that films of some of the copolyesters of this invention have high machine direction (MD) moduli (e.g., 1000 Kpsi or greater) and high MD strength (e.g., 40 Kpsi or greater). Transverse direction (TD) properties of the films can be improved substantially by orientation.

Composite structures can be prepared using known methods by combining the copolyesters of this invention with fibrous substrates or particulate fillers or by combining fibers of the copolyesters of this invention with resin materials. Fibrous substrates can include woven, nonwoven, tow, felt or undirectional continuous fibers. For many applications, such as various aerospace components, carbon fibers, and aramid fibers, which produce light and strong composites, are most preferred. Other fibers include, among others, glass, boron and asbestos fibers. Particulate fillers include carbon and graphite powders, mica, silica, clay and silicon carbide whiskers. The composite structures may optionally contain additives such as antioxidants, pigments, coupling agents for fillers, lubricants and antistick agents.

The copolyesters of this invention, their properties, their preparation and use are further illustrated by the following examples. The following test procedures were used to measure properties of the copolyesters in the examples.

Inherent viscosity ($n_{inh}$), a measure of molecular weight, was computed from $n_{inh} = (\ln n_{rel})/C$ were $n_{rel}$ is the relative viscosity and C is solution concentration in grams of polymer per deciliter of solvent. Relative viscosity is the ratio of polymer solution flow time to solvent flow time in a capillary viscometer at 25° C. The solvent mixture employed consisted of 50% by volume 1,2-dichloroethane and 50% by volume 4-chlorophenol. (Other solvents which could be used include pentafluorophenol, hexafluoroisopropanol or straight 4-chlorophenol.) The concentration was 0.5 g polymer per deciliter of solvent.

Thermal characterization of the polymers by differential scanning calorimetry (DSC) was performed with the use of a Du Pont Model 1090 Thermal Analyzer, equipped with a Du Pont DSC cell. A known weight of polymer (usually 5 to 10 mg) was sealed in an aluminum DSC pan and maintained under nitrogen throughout the test. The sample was subjected to a heating cycle to remove the effects of prior thermal history. This cycle consisted of heating from room temperature to 360° to 420° C. at a rate of 25° C./min, followed by holding the sample at the final temperature for 0 to 2 min. The sample was then cooled from the upper hold temperature to 30° to 40° C. at a rate of 30° C./min and then maintained at 30° to 40° C. for 2 minutes. The sample is then subjected to a second heat-up cycle. This cycle consisted of heating the sample from the lower hold temperature to 360° to 420° C. at a rate of 25° C./min. The glass transition temperature (Tg) is defined as the midpoint of the change in heat flow from the curve of heat flow versus temperature. The crystalline melting temperature (Tm) is defined as the maximum of the characteristic melting endotherm. The Tm is recorded from the first heat-up cycle, whereas Tg is recorded from the second heat-up cycle.

Tensile properties for Examples 1 to 6 were measured at room temperature with an Instron machine by using a cross-head speed of 0.02 inch/min. and a grip distance of 0.50 inch. The modulus (Mod) reported is the initial Young's modulus in Kpsi units derived from a stress-strain curve determined with the use of an Instron 0.5 Inch Extensometer. The strength (Str) is the strength at break in Kpsi units and the elongation is the elongation (El) at break in percent (%). Tensile properties were measured for samples in the form of microtensile bars with a cross section of 1/16 inch × ⅛ inch.

Flexural properties for Examples 1 to 6 of injection-molded samples were measured at room temperature with an Instron machine by using a cross-head speed of 0.05 inch/min and a span of 1.0 inch. The modulus (Mod), strength (Str), and elongation (El) at break are repeated in the same units and determined in a manner similar to the tensile properties. Flexural properties were measured for samples in the form of flexural bars with cross section of 1/16 inch × ½ inch.

The mechanical properties reported in Examples 1–6 represent average properties for at least three samples, usually five samples.

In the following examples, unless otherwise indicated, the copolyesters were injection molded using a Watson Stillman one ounce injection molding machine. The ram speed was about 62 inch/min., and the total cycle time was about 40 seconds. Specific barrel temperature and pressure conditions are presented in the examples.

The following abbreviations are used in the examples:
TBHQ = 2-t-butylhydroquinone
BP = 4,4'-biphenol
TPA = terephthalic acid
1,4HBA = 4-hydroxybenzoic acid The copolyesters made in the examples were prepared in a kettle fitted with a (1) stainless steel stirrer extending through a pressure-tight resin bushing, (2) a nitrogen inlet, and (3) a short column leading to a water-cooled condenser with a receiver for collecting acetic acid by-product. An attachment for application of vacuum was also provided. An electrically heated Wood's metal bath mounted for vertical adjustment was used for heating. The reaction mixture was heated to increasing temperatures with stirring at atmospheric pressure under nitrogen purge until at least about 85% of the theoretical acetic acid had evolved. The vacuum was then applied and pressure gradually reduced from atmospheric to generally less than 1 mm of mercury. Heating under vacuum at less than 1 mm mercury pressure was then continued until viscosity had increased to a level believed satisfactory for processing into useful articles. For example, this period could be less than 1 hour if the final material was to be melt-spun into fibers, or could be as long as 2 hours if the final material was to be injection-molded into shaped articles. The polymer was removed from the resin kettle while hot, cooled to room temperature, and comminuted prior to processing.

In the examples, the copolyesters were prepared from the diacetate of the aromatic diols and the mono-acetate of the aromatic hydroxycarboxylic acid. The dicarboxylic acids were used as such rather than as esters or other derivatives. The monomer ingredients were added in substantially the same molar ratios as desired in the final polymer except that an excess (usually about 0.5 to 4%) of acetylated t-butylhydroquinone was used.

EXAMPLE 1

A polymer with the composition
20.0 mole % TBHQ
5.0 mole % BP
25.0 mole % TPA
50.0 mole % 1,4 HBA
was prepared by mixing the following in the polymerization vessel:
30.8 g TBHQ diacetate (0.123 mole including 2.5% excess),
8.1 g BP diacetate (0.030 mole),
24.9 g TPA (0.150 mole), and
54.0 g, 1,4HBA Acetate (0.300 mole).

The mixture was heated with continuous stirring in the polymerization vessel from approximately 130° C. to approximately 270° C. during 75 minutes at atmospheric pressure under under nitrogen purge. The reaction mixture was then heated to about 325° C. during 195 minutes after which time approximately 85% of theoretical acetic acid had evolved and was removed from the vessel. During about 75 minutes the temperature was raised to 330° C. and the pressure was reduced from atmospheric to less than 15 mm mercury. The heating was continued at 330° C. and the pressure was reduced further to below 0.15 mm mercury during about 110 minutes.

After cooling and solidification, 70.4 g (87% of theoretical) of polymer was recovered. The resultant polymer did not display a crystalline melting endotherm, as determined by differential scanning calorimetry. Inherent viscosity was 5.26 dL/g measured in 1,2-dichloroethane/4-chlorophenol (50/50, v/v). The polymer formed an optically anisotropic melt up to at least 400° C., as determined by optical microscopy (TOT test). A tough opaque film could be pressed easily at 300° C. The comminuted polymer was injection molded at 330° C. and 350 pounds/square inch pressure into microtensile bars and flexural bars. The tensile modulus, tensile strength, and elongation at break were measured to be 3538 Kpsi, 28.7 Kpsi, and 1.1%, respectively. The flexural modulus, flexural strength, and elongation at break were measured to be 2418 Kpsi, 33.0 Kpsi, and 2.3% respectively.

EXAMPLE 2

Using a procedure similar to that described above in Example 1, the following copolyesters were made.

| Example | Mole % | | | |
|---|---|---|---|---|
| | TBHQ | BP | TPA | 1,4 HBA |
| 2A | 31.7 | 1.7 | 33.3 | 33.3 |
| 2B | 30.1 | 3.3 | 33.3 | 33.3 |
| 2C | 26.7 | 6.7 | 33.3 | 33.3 |

Properties of these copolyesters are presented in Tables 1a and 1c.

TABLE 1a

Polymer Characterizations

| Example | Inherent Viscosity (dL/g) | Melting Temperature (°C.) | Optically Anisotropic Melt (TOT Test) |
|---|---|---|---|
| 2A | 4.78 | 356 | YES |
| 2B | 4.92 | 332 | YES |
| 2C | 4.76 | NONE | YES |

TABLE 1b

Molding Conditions

| Example | Barrel Temperature (°C.) Top/Bottom | Pressure (psi) | Mold Temperature (°C.) |
|---|---|---|---|
| 2A | 350/350 | 300 | 25 |
| 2B | 300/300 | 300 | 25 |
| 2C | 300/300 | 500 | 25 |

TABLE 1c

Mechanical Properties

| Example | Tensile Mod/Str/El (Kpsi/Kpsi/%) | Flexural Mod/Str/El (Kpsi/Kpsi/%) |
|---|---|---|
| 2A | 3594/26.1/0.9 | 2629/32.1/1.6 |
| 2B | 4401/36.2/1.1 | 2921/39.1/2.3 |
| 2C | 3634/39.3/1.6 | 2356/34.7/2.7 |

EXAMPLE 3

Using a procedure similar to that described in Example 1, the following copolyesters were made.

| Example | Mole % | | | |
|---|---|---|---|---|
| | TBHQ | BP | TPA | 1,4 HBA |
| 3A | 32.0 | 8.0 | 40.0 | 20.0 |
| 3B | 28.6 | 7.1 | 35.7 | 28.6 |
| 3C | 16.0 | 4.0 | 20.0 | 60.0 |
| 3D | 36.0 | 4.0 | 40.0 | 20.0 |
| 3E | 22.5 | 2.5 | 25.0 | 50.0 |

Properties of these copolyesters are presented in Tables 2a and 2c.

TABLE 2a

| | Polymer Characterizations | | |
|---|---|---|---|
| Example | Inherent Viscosity (dL/g) | Melting Temperature (°C.) | Optically Anisotropic Melt (TOT Test) |
| 3A | INSOLUBLE | 371 | YES |
| 3B | 7.21 | NONE | YES |
| 3C | INSOLUBLE | 401 | YES |
| 3D | 6.29 | 379 | YES |
| 3E | 4.76 | 376 | YES |

TABLE 2b

| | Molding Conditions | | |
|---|---|---|---|
| Example | Barrel Temperature (°C.) Top/Bottom | Pressure (psi) | Mold Temperature (°C.) |
| 3A | 350/350 | 600 | 25 |
| 3B | 300/300 | 400 | 25 |
| 3C | 330/330 | 800 | 25 |
| 3D | 350/350 | 500 | 25 |
| 3E | 350/350 | 400 | 25 |

TABLE 2c

| | Mechanical Properties | |
|---|---|---|
| Example | Tensile Mod/Str/El (Kpsi/Kpsi/%) | Flexural Mod/Str/El (Kpsi/Kpsi/%) |
| 3A | 2801/30.7/1.4 | 2082/30.6/2.1 |
| 3B | 3500/33.2/1.3 | 2503/38.7/2.7 |
| 3C | 2831/15.5/0.7 | 2094/26.4/2.1 |
| 3D | 3374/26.6/0.9 | 2487/33.2/1.6 |
| 3E | 3132/24.7/0.9 | 2749/29.7/1.4 |

EXAMPLE 4

Using a procedure similar to that described in Example 1, the following copolyesters were made.

| | Mole % | | | |
|---|---|---|---|---|
| Example | TBHQ | Diol (%) | TPA | 1,4 HBA |
| 4A | 30.1 | 3-hydroxy-4'-(4-hydroxyphenyl) benzophenone (3.3%) | 33.3 | 33.3 |
| 4B | 26.7 | 2,6-dihydroxynaphthalene (6.7%) | 33.3 | 33.3 |
| 4C | 20.0 | 2,2-bis(4-hydroxyphenyl) propane (5.0%) | 25.0 | 50.0 |
| 4D | 30.1 | bis(4-hydroxyphenyl)sulfone (3.3%) | 33.3 | 33.3 |

Properties of these copolyesters are presented in Tables 3a and 3c.

TABLE 3a

| | Polymer Characterizations | | |
|---|---|---|---|
| Example | Inherent Viscosity (dL/g) | Melting Temperature (°C.) | Optically Anisotropic Melt (TOT Test) |
| 4A | 4.10 | NONE | YES |
| 4B | 4.75 | NONE | YES |
| 4C | 2.72 | NONE | YES |
| 4D | 2.98 | NONE | YES |

TABLE 3b

| | Molding Conditions | | |
|---|---|---|---|
| Example | Barrel Temperature (°C.) Top/Bottom | Pressure (psi) | Mold Temperature (°C.) |
| 4A | 300/300 | 400 | 25 |
| 4B | 300/300 | 300–400 | 25 |
| 4C | 300/300 | 500 | 25 |
| 4D | 320/310 | 300–400 | 25 |

TABLE 3c

| | Mechanical Properties | |
|---|---|---|
| Example | Tensile Mod/Str/El (Kpsi/Kpsi/%) | Flexural Mod/Str/El (Kpsi/Kpsi/%) |
| 4A | 4485/35.6/0.9 | 3572/50.1/2.3 |
| 4B | 3293/38.2/1.6 | 2562/43.4/2.5 |
| 4C | 1940/25.7/2.0 | 1752/27.5/2.3 |
| 4D | 3687/27.5/0.8 | 2128/33.5/2.2 |

EXAMPLE 5

Using a procedure similar to that described in Example 1, the followng copolyesters were made.

| | Mole % | | | |
|---|---|---|---|---|
| Example | TBHQ | BP | Dicarboxylic acid (%) | 1,4 HBA |
| 5A | 20.0 | 5.0 | Isophthalic acid (25.0%) | 50.0% |
| 5B | 26.7 | 6.7 | trans-1,4-cyclohexane (33.3%) (>95% trans isomer) | 33.3% |
| 5C | 26.7 | 6.7 | mixture of 2,6-naphthalene dicarboxylic acid and terephthalic acid (TPA) (16.65 mol % each) | 33.3% |

Properties of these copolyesters are presented in Tables 4a and 4c.

TABLE 4a

| | Polymer Characterizations | | |
|---|---|---|---|
| Example | Inherent Viscosity (dL/g) | Melting Temperature (°C.) | Optically Anisotropic Melt (TOT Test) |
| 5A | 1.24 | 317 | YES |
| 5B | 4.79 | NONE | YES |
| 5C | 5.12 | NONE | YES |

TABLE 4b

| | Molding Conditions | | |
|---|---|---|---|
| Example | Barrel Temperature (°C.) Top/Bottom | Pressure (psi) | Mold Temperature (°C.) |
| 5A | 330/330 | 500 | 25 |
| 5B | 310/300 | 300 | 25 |
| 5C | 310/300 | 300–400 | 25 |

TABLE 4c

| | Mechanical Properties | |
|---|---|---|
| Example | Tensile Mod/Str/El (Kpsi/Kpsi/%) | Flexural Mod/Str/El (Kpsi/Kpsi/%) |
| 5A | 998/8.6/1.0 | 955/12.4/1.5 |
| 5B | 1734/24.9/1.9 | 1262/26.3/3.1 |
| 5C | 2626/34.4/1.8 | 1798/36.5/3.2 |

EXAMPLE 6

Using procedures similar to that described in Example 1, the following copolyesters were made.

| Example | Mole % | | | |
|---|---|---|---|---|
| | TBHQ | BP | TPA | 6-hydroxy-2-naphthoic acid |
| 6A | 26.7 | 6.7 | 33.3 | 33.3 |
| 6B | 32.0 | 8.0 | 40.0 | 20.0 |

Properties of these copolyesters are presented in Tables 5a and 5c.

TABLE 5a

| | Polymer Characterizations | | |
|---|---|---|---|
| Example | Inherent Viscosity (dL/g) | Melting Temperature (°C.) | Optically Anisotropic Melt (TOT Test) |
| 6A | 3.70 | NONE | YES |
| 6B | 3.37 | 320 | YES |

TABLE 5b

| | Molding Conditions | | |
|---|---|---|---|
| Example | Barrel Temperature (°C.) Top/Bottom | Pressure (psi) | Mold Temperature (°C.) |
| 6A | 300/300 | 300 | 25 |
| 6B | 300/300 | 300 | 25 |

TABLE 5c

| | Mechanical Properties | |
|---|---|---|
| Example | Tensile Mod/Str/El (Kpsi/Kpsi/%) | Flexural Mod/Str/El (Kpsi/Kpsi/%) |
| 6A | 2803/32.1/1.4 | 2158/37.5/2.5 |
| 6B | 2026/31.5/2.3 | 1846/33.3/2.6 |

EXAMPLE 7

Using procedures similar to that described in Example 1, the following copolyesters were made.

| Example | Mole % | | | |
|---|---|---|---|---|
| | TBHQ | BP | TPA | 1,4 HBP |
| 7A | 26.7 | 6.7 | 33.3 | 33.3 |
| 7B | 30.1 | 3.3 | 33.3 | 33.3 |

The copolyester had the properties indicated in Table 6a.

TABLE 6a

| | Polymer Characterizations | | |
|---|---|---|---|
| Ex. | Inherent Viscosity (dL/g) | Melting Temperature (°C.) | Optically Anisotropic Melt (TOT Test) |
| 7A | 2.56 | NONE | YES |
| 7B | 3.35 | 323 | YES |

Filaments were prepared by melt-spinning the copolyesters into a quenching atmosphere of air or nitrogen and collecting at a windup speed specified below in Table 6b. The spinneret had ten capillaries. Samples of undrawn (as-spun) multi-filament yarn, substantially free of tension, were subjected to a standard heat-treatment process in an oven as described in U.S. Pat. Nos. 4,183,895 and 4,412,058. (Specifically, the fibers were heated from room temperature to 200° C. in 2 hours; then from 200° C. to 306° C. in 7.3 hours; held at 306° C. for 7.5 hours; then cooled to room temperature in 2 hours.) Heating was in stages in a nitrogen atmosphere. Multi-filament tensile properties were measured using a stress-strain analyzer at 21° C. and 65% relative humidity using 3 turns-per-inch twist, a test rate of 10% per minute and a gauge length of 10 in. (25.4 cm). Results are reported as D/T/E/M where D is linear density in denier (d) units of the multi-filament bundle, T is the break tenacity in grams/denier (gpd), E is elongation-at-break expressed as the percentage (%) by which initial length is increased, and M is the initial modulus in gpd. Properties set forth in Table 6b represent averages for seven multi-filaments.

TABLE 6b

| | Tensile Properties | |
|---|---|---|
| Example | Spinneret Temperature | D/T/E/M* (deniers/gpd/%/gpd) |
| 7A | 319 | 45.7/25.4/3.4/588 |
| 7A | 326 | 45.7/23.7/3.4/561 |
| 7B | 345 | 50.8/24.7/3.4/590 |
| 7B | 337 | 82.1/25.0/3.5/594 |

*10" gauge length; 1"/min. elongation rate; average of seven specimens

EXAMPLE 8

A copolyester of
26.7 mole % TBHQ
6.7 mole % BP
33.3 mole % TPA
33.3 mole % 1,4 HBA
was prepared using a procedure similar to that described in Example 1. The polymr had an inherent viscosity of about 3.6 dL/g, did not display a crystalline melting point and formed an optically anisotropic melt.

This copolyester was injection molded using an H.P.M. Corp. six ounce screw-type injection molding machine. The screw rate was about 75 revolutions per minute, the ram speed was about the maximum for the machine, and the total cycle time was about 90 seconds. Molding conditions and mechanical properties are presented in Tables 7a and 7b. Flexural and tensile properties were measured at room temperature for samples with a cross section of ⅛ inch×½ inch (ASTM Tests D-790 and D-638). Properties reported represent an average of measurements for five samples.

TABLE 7a

| Molding Conditions | | |
|---|---|---|
| Barrel Temperature (°C.) Rear/Center/Front | Pressure (psi) | Mold Temperature (°C.) |
| 270/298/295 | 770 | 50 |

TABLE 7b

| Mechanical Properties | |
|---|---|
| Tensile Mod/Str/El (Kpsi/Kpsi/%) | Flexural Mod/Str/El (Kpsi/Kpsi/%) |
| 3059/17.2/0.93 | 2400/35.4/3.2 |

EXAMPLE 9

A copolyester of
26.7 mole % TBHQ
6.7 mole % BP 33.3 mole % TPA
33.3 mole % 1,4 HBA
was prepared using a procedure similar to that described in Example 1. The polymer had an inherent viscosity of about 3.6 dL/g, did not display a crystalline melting point and formed an optically anisotropic melt.

This copolyester was extruded into films having thicknesses from 2 to 20 mils using a vented 28 mm Werner-Pfleiderer twin screw extruder feeding a 10 inch wide vertical die having a 15 mil die lip opening. The barrel and die temperatures ranged from 295° to 308° C. and the screw speed was 150 rpm. The polymer melt was quenched on a 10 inch diameter oil heated drum maintained at 155° C. An electrostatic pinning wire was used to hold the film to the drum during the quenching process. Machine direction (MD) and transverse direction (TD) tensile properties were determined at 22° C. using an Instrom machine and film samples 2" by ½" in dimension. The tensile properties (Table 8a) show that the MD properties increase with increasing melt drawdown.

TABLE 8a

| Thickness mils | Tensile Properties vs. Thickness | | | | | |
|---|---|---|---|---|---|---|
| | Modulus, Kpsi | | Tensile, Kpsi | | Elongation, % | |
| | MD | TD | MD | TD | MD | TD |
| 2 | 4050 | — | 67 | — | 2.2 | — |
| 5 | 3400 | 188 | 70 | 3 | 2.4 | 1.7 |
| 10 | 1520 | 168 | 43 | 3 | 3.9 | 1.5 |

The properties of the 10 mil film were further improved in both directions by TD stretching (2X) the film while restraining the film in the MD at 200° C. in a T. M. Long Co. biaxial stretching machine. The tensile properties are given in Table 8b.

TABLE 8b

| Tensile Properties of TD Stretched (2X) 10 mil Film | | | | | |
|---|---|---|---|---|---|
| Modulus, Kpsi | | Tensile, Kpsi | | Elongation, % | |
| MD | TD | MD | TD | MD | TD |
| 2970 | 199 | 61 | 5 | 2.3 | 3.6 |

COMPARATIVE EXAMPLE

The purpose of this example is to provide a comparison of the copolyesters claimed herein with what are believed to be the closest prior art copolyesters, those described in the Jackson article. A polymer corresponding to that disclosed in FIG. 5 of the Jackson article having about 50 mole % 4-hydroxybenzoic acid (calculated according to Jackson's method) was made for comparison with the polymers of Examples 2A and 2C. Note that Jackson's method for calculating mole % hydroxycarboxylic acid, described at page 191 of his article, differs friom the method used herein. His 50 mole % hydroxcarboxylic acid coresponds to our 33 mole % hydroxycarboxylic acid polymer. The three polymers have the following composition:

TABLE 9a

| Example | Polymer Composition (mole %) | | | |
|---|---|---|---|---|
| | t-butyl hydroquinone | 4,4'-biphenol | terephthalic acid | 1,4-hydroxybenzoic acid |
| Jackson (comparative) | 33 | 0 | 33 | 33 |
| 2A | 31.7 | 1.7 | 33 | 33 |
| 2C | 26.7 | 6.7 | 33 | 33 |

The diol in Example 2A is 95 mole % t-butylhydroquinone and in Example 2C is 80 mole % t-butylhydroquinone.

The properties and molding conditions for the three polymers are presented in Tables 9b-9d.

TABLE 9b

| | Polymer Characterizations | |
|---|---|---|
| Example | Inherent Viscosity (dL/g) | Melting Temperature (°C.) |
| Jackson | 5.26 | 387 |
| 2A | 4.78 | 356 |
| 2C | 4.76 | NONE |

TABLE 9c

| | Molding Conditions | | |
|---|---|---|---|
| Example | Barrel Temperature Top/Bottom (°C.) | Pressure (psi) | Mold Temperature (°C.) |
| Jackson | 350/350 | 500 | 25 |
| 2A | 350/350 | 300 | 25 |
| 2C | 300/300 | 500 | 25 |

TABLE 9d

| Example | Properties | | | |
|---|---|---|---|---|
| | Tensile Mod/Str/El (Kpsi/Kpsi/%) | Major Softening Temp. (°C.)[a] | I.V.[b] (dL/g) | Melt Viscosity[c] (Pa.s @ 350° C.) |
| Jackson | 2763/15.2/0.6 | 317.5 | 2.45 | 26.3 |
| 2A | 3594/26.1/0.9 | 287.5 | 2.64 | 15.2 |
| 2C | 3634/39.3/1.6 | 265 | 2.99 | 12.8 |

(a) Softening points were measured on injection molded bars with a thickness of 1/16 inch with a Du Pont 943 Thermomechanical Analyzer having a 10 gram weight on a tipped probe (0.025 inch diameter) and a scan rate of 10° C./min. The softening point was taken as the major chart deflection.

(b) Measured for injection molded bars with a thickness of 1/16 inch.

(c) The copolyesters in the form of injection molded bars were comminuted and dried under vacuum at 100° C. prior to analysis. The data were measured using a nozzle having a length/diameter ratio of 45 and a shear speed of $10^3$ sec$^{-1}$.

These data show that the copolyesters of this invention (2A and 2C) possess melting temperatures below that of the Jackson polymer (or, in the case of Example 2C, no melting temperature at all) and also possess softening temperature substantially below that of the Jackson polymer. The copolyesters of this invention also possess substantially lower melt viscosities than the Jackson polymer. Thus, the tests indicate that the copolyesters of this invention exhibit greater processbility then the copolyesters of the Jackson article. In addition to this improvement in processability, the copolyesters of this invention possess substantially improved mechanical properties compared to the Jackson polymers, as evidenced by the data for tensile properties in Table 9d.

What is claimed is:

1. A copolyester capable of forming an optically anisotropic melt consisting essentially of:
   I. An aromatic diol component consisting essentially of 95 to 55 mole % t-butylhydroquinone and 5 to 45 mole % of one or more polyaromatic diols;
   II. A dicarboxylic acid component selected from a "para"- or "metal"-oriented aromatic dicarboxylic or 1,4-cyclohexane dicarboxylic acid or mixtures thereof, provided that no more than 80 mole % of the dicarboxylic acid component comprises a napthalene dicarboxylic acid; and
   II. An aromatic hydroxycarboxylic acid component selected from 4-hydroxybenzoic acid, 6-hydroxy-2-naphthoic acid and 4-(4'-hydroxyphenyl)benzoic acid or mixtures thereof;
   where said copolyester contains equal chemical equivalents of components I and II and contains about 20 to 60 mole %, based on total moles I +II+III, of component III.

2. A copolyester of claim 1 in which the polyaromatic diol is selected from 4,4'-biphenol, bisphenol-A, 3-hydroxy-4'-(4-hydroxyphenyl)benzophenone, 2,6- or 2,7-dihydroxynaphthalene, 3,4'- or 4,4'-dihydroxybenzophenone, 4,4'-dihydroxydiphenylsulfone, 4,4'-dihydroxydiphenylether and 4,4'-dihydroxydiphenylsulfide and mixtures thereof.

3. A copolyester of claim 2 in which the polyaromatic diol is 4,4'-biphenol or bisphenol-A.

4. A copolyester of claim 1, 2 or 3 where the aromatic diol consists of 95 to 75 mole % t-butylhydroquinone.

5. A copolyester of claim 4 where the aromatic diol consists of 90 to 80 mole % t-butylhydroquinone.

6. A copolyester of claim 1 or 2 where the dicarboxylic acid is selected from terephthalic acid, isophthalic acid, trans-1,4-cyclohexane dicarboxylic acid, 2,6-naphthalene dicarboxylic acid and mixtures thereof, provided that no more than about 50 mole % of the dicarboxylic acid is isophthalic acid and no more than about 60 mole % of the dicarboxylic acid is 2,6-napthalene dicarboxylic acid.

7. A copolyester of claim 6 where the dicarboxylic acid is terephthalic acid.

8. A copolyester of claim 1 or 2 which contains about 25 to 50 mole % of an aromatic hydroxycarboxylic acid selected from 4-hydroxybenzoic acid and 6-hydroxy-2-naphthoic acid and mixtures thereof.

9. A copolyester of claim 8 where the hydroxyacid is selected from 4-hydroxybenzoic acid, 6-hydroxy-2-naphthoic acid and mixtures thereof which mixtures contain at least about 85 mole % 4-hydroxybenzoic acid.

10. A copolyester of claim 8 which contains about 25 to 35 mole % of a hydroxyacid which is 4-hydroxybenzoic acid.

11. A polyester of claim 1 wherein
   the aromatic diol component (I) consists essentially of 95 to 75 mole % t-butylhydroquinone and 10 to 25 mole % of a diol selected from 4,4'-biphenol, bisphenol-A, 3-hydroxy-4'-(4-hydroxyphenyl)benzophenone, 2,6- or 2,7-dihydroxy-naphthalene, 3,4'- or 4,4'-dihydroxybenzophenone, 4,4'-dihydroxydiphenylsulfone, 4,4'-dihydroxydiphenylether, 4,4'-dihydroxydiphenylsulfide and mixtures thereof;
   the aromatic diacid component (II) is selected from terephthalic acid, isophthalic acid, trans-1,4-cyclohexene dicarboxylic acid, 2,6-naphthalene dicarboxylic acid and mixtures thereof, provided that no more than about 50 mole % of the dicarboxylic acid is isophthalic acid and no more than about 60 mole % of the dicarboxylic acid is 2,6-naphthalene dicarboxylic acid;
   the aromatic hydroxyacid component (III) is selected from 4-hydroxybenzoic acid and 6-hydroxy-2-naphthoic acid and mixtures thereof;
   and the copolyester contains about 25 to 50 mole %, based on total moles I+II+III, of component III.

12. A copolyester of claim 1 wherein
   the aromatic diol component (I) is 90 to 80 mole % t-butylhydroquinone and 10 to 20 mole % of 4,4'-biphenol or bisphenol-A;
   the aromatic diacid component (II) is terephthalic acid; and
   the aromatic hydroxyacid component (III) is 4-hydroxybenzoic acid;
   and said copolyester contains 25 to 35 mole %, based on total I+II+III, of 4-hydroxybenzoic acid.

13. A copolyester of any of claims 1, 11 or 12 which has an inherent viscosity of at least about 2 dL/g measured at 25° C. in a 50/50 by volume mixture of 1,2-dichloroethane and 4-chlorophenol.

14. A copolyester of claim 13 which either has a crystalline melting temperature below 350° C. or which has no crystalline melting temperature.

15. A shaped article obtained by extruding, compression molding or injection molding a copolyester of claim 1, 11 or 12.

16. A shaped article of claim 15 which is a film having a machine direction tensile modulus of at least about 1000 Kpsi and machine direction tensile strength of at least about 40 Kpsi, both measured at room temperature.

17. A shaped article of claim 15 which is a heat-treated fiber having a tenacity of at least about 20 g/d and an initial modulus of at least about 500 g/d, both measured at room temperature.

18. A shaped article of claim 15 which is a molded part having a flexural or tensile strength of at least about 15 Kpsi, and a flexural or tensile modulus of at least about 2000 Kpsi, both measured at room temperature.

19. A composite structure consisting essentially of (a) a copolyester of claim 1, 11 or 12 and (b) either of fibrous substrate or a particulate filler.

20. A composite structure consisting essentially of (a) one or more resins and (b) a fiber of a copolyester of claim 1, 11, or 12.

21. A process for preparing a copolyester of claim 1 comprising contacting under reaction conditions the diacetates of the aromatic diols, the mono-acetates of the hydroxyacid(s), and the dicarboxylic acid(s) in the desired quantities such that a molar excess of about 0.5 to 4 mole % of tert-butyhydroquinone is present and such that there are otherwise substantially equimolar quantities of acetate and carboxylic acid moieties.

* * * * *

UNITED STATES PATENT AND TRADEMARK OFFICE
CERTIFICATE OF CORRECTION

PATENT NO. : 4,664,972
DATED : May 12, 1987
INVENTOR(S) : Mark S. Connolly

It is certified that error appears in the above-identified patent and that said Letters Patent is hereby corrected as shown below:

Column 17,
Line 15, delete "II. An aromatic hydroxycarboxylic acid component", and insert -- III. An aromatic hydroxycarboxylic acid component --.

Signed and Sealed this

First Day of April, 2003

JAMES E. ROGAN
*Director of the United States Patent and Trademark Office*